United States Patent [19]
Koch et al.

[11] 3,885,024
[45] May 20, 1975

[54] PROCESS FOR THE PREPARATION OF PYROSULPHATES
[75] Inventors: Paolo Koch, San Giuliano Milanese; Emilio Perrotti, San Donato Milanese, both of Italy
[73] Assignee: Snamprogetti S.p.A., San Donato Milanese, Italy
[22] Filed: May 21, 1973
[21] Appl. No.: 362,052

[52] U.S. Cl................................. 423/512; 423/545
[51] Int. Cl............................................ C01b 17/98
[58] Field of Search..................... 423/545, 551, 512

[56] References Cited
UNITED STATES PATENTS
1,313,192   8/1919   Kee...................................... 423/551

FOREIGN PATENTS OR APPLICATIONS
396,348   4/1909   France.............................. 423/545

Primary Examiner—Oscar R. Vertiz
Assistant Examiner—Gary P. Straub
Attorney, Agent, or Firm—Ralph M. Watson

[57] ABSTRACT

A pyrosulfate of ammonium or an alkali metal is prepared by reacting the hydroxide of ammonium or the alkali metal with sulfurous oxide in an alcohol, such as isopropyl alcohol, which is liquid under the reaction conditions and has more than three carbon atoms, in the presence of oxygen, at atmospheric pressure and room temperature, through the use, as catalyst, of a compound of a transition metal (e.g., Cu $Cl_2$).

4 Claims, No Drawings

PROCESS FOR THE PREPARATION OF PYROSULPHATES

The present invention relates to a process for the preparation of ammonium and alkali metal pyrosulphates.

The preparation of pyrosulphates is known, being generally carried out by dehydrateing the acid sulphate at high temperatures (250°–300°C) or by suspending the neutral sulphate in $SO_3$ and removing the excess of sulphuric anhydride. However the known processes make use of special apparatuses, often complex and quite expensive.

It is also known the alkaline pyrosulphates are employed in the oxidation catalyst field together with transition metal or in specific fields.

It has now been surprisingly found, which is the subject of the present invention, that it is possible to synthesize the aforesaid products according to simple methods, without employing complex technologies.

The inventive process, which makes it possible obtain ammonium and alkali metal pyrosulphates by a method which may be simply and economically performed, is based on a reaction between sulphurous anhydride and the hydroxide of the element in question, and is carried out in alcohol in the presence of oxygen and by employing, as catalysts, transition metal complexes or salts.

The reaction can be carried out either by bubbling oxygen and $SO_2$ into an alcoholic solution of the starting compound and the catalyst, or by mixing an alcoholic solution of the compound with a sulphurous anhydride and bubbling oxygen therein; in the particular case of the preparation of ammonium pyrosulphate, use may be made of a preformed solution of ammonium hydroxide dissolved in alcohol; or ammonia itself may be employed in the gaseous state, which is bubbled into other alcoholic solutions already formed and suitably mixed, $NH_4OH$ being formed in the reaction vessel.

As noted above, the reaction runs in the presence of an alcohol: all alcohols can be employed, provided they are liquid under the reaction conditions and containing three or more carbon atoms. Generally use is made of the alcohols which are commerically available. Peculiar advantages have been obtained by employing isopropyl and n-butyl alcohol.

The reaction runs to the formation of the final product, it being catalyzed by transition metal complexes or salts.

The complexes which are active for this reaction are the ones of the 8th group and the 1st sub-group.

The copper compounds are particularly effective as to selectivity and kinetics. They can be employed as salts, hydrated salts or complexes with organic ligands. For instance use may be made of the cuprous or cupric salts containing the following anions: $Cl^-$ $Br^-$ $I^-$ $ClO_4^-$ $SO_4^=$ $CH_3COO^-$ as such, or in a hydrated form, or complexed by nitrogenous organic bases.

The starting oxidation state of the metal is not important, provided that the reaction environment is such as to ensure the continuous presence of the catalytic redox couple Cu (I)/Cu(II).

These conditions are surely achieved when the reaction vessel is continuously fed with oxygen ($O_2$) and the reducing compound ($SO_2$).

The reaction pressure is not very important in order to perform the reaction, whereas the temperature is not to be encreased beyond 60°C in order to prevent the obtained pyrosulphate from undergoing a reaction with alcohol, which might give rise to alkylsulphates.

The reaction is preferably carried out at room temperatures and pressures, and also oxygen is fed at atmospheric pressure.

Further working characteristics will be pointed out in the following illustrative examples, without limiting the purposes thereof.

EXAMPLE 1

At 25°C, 8 m.moles of KOH dissolved in isopropyl alcohol were added to a solution containing 15 mM of $SO_2$ and 0.1 m.mole of $CuCl_2$ in 20 ml of wet isopropyl alcohol (0.3 % $H_2O$), the solution being kept under an oxygen atmosphere at 760 Torr.

The reaction consumed 4 m.moles of $O_2$ and, after filtration, 3.75 m.moles of $K_2S_2O_7$ were isolated. The $SO_2$ conversion was 50 %, while the yield in pyrosulphate was 95 %.

EXAMPLE 2

94 m.moles of $NH_3$ dissolved in 40 ml of alcohol were slowly added to 100 ml of isopropyl alcohol containing 115 m.moles of $SO_2$, 31 m.moles of $H_2O$ and 0.1 m.moles of $CuCl_2Pu_2$ under an oxygen atmosphere. The reaction totally consumed 31 m.moles of oxygen and, after filtration, 5.8 g of a white solid were isolated.

We ascertained that it was constitued by ammonium pyrosulphate on the basis of the melting point (236°C), I.R. spectrum (1,260, 1,095, 1,045 $cm^{-1}$) and the characteristic reactivity thereof. The $SO_2$ conversion was 50 %, and the yield in pyrosulphate was 89 %.

What we claim is:

1. A process for the preparation of ammonium and alkali metal pyrosulphates characterized in that ammonium or alkali metal hydroxide is reacted with sulphurous anhydride and oxygen in an alcohol containing 3 or more carbon atoms, at temperatures lower than 60°C by employing, as catalyst, a copper compound selected from cuprous or cupric salts of the anions $Cl^-$, $Br^-$, $I^-$, $ClO_4^-$, $SO_4^=$, and $CH_3COO^-$.

2. The process according to claim 1, wherein the reaction is performed in the presence of said copper compound in a hydrated form.

3. The process according to claim 1, wherein the reaction is carried out in the presence of said copper salt, when complexed with a nitrogenous organic base.

4. The process according to claim 1, wherein the reaction is carried out in isopropyl alcohol.

* * * * *

UNITED STATES PATENT AND TRADEMARK OFFICE
CERTIFICATE OF CORRECTION

PATENT NO. : 3,885,024
DATED : May 20, 1975
INVENTOR(S) : Paolo Koch and Emilio Perrotti It is certified that error appears in the above-identified patent and that said Letters Patent are hereby corrected as shown below:

First page, after line "[21]" insert the following lines:

--[30] Foreign Application Priority Data

May 19, 1972 Italy .......24558A/72--.

Column 2, line 35, "$CuCl_2Pu_2$" should read -- $CuCl_2Py_2$ --.

line 40, "(1,260, 1,095, 1,045 $cm^{-1}$)" should read -- (1260, 1095, 1045 $cm^{-1}$) --.

Signed and Sealed this

*thirtieth* Day of *December 1975*

[SEAL]

*Attest:*

RUTH C. MASON
*Attesting Officer*

C. MARSHALL DANN
*Commissioner of Patents and Trademarks*